(12) United States Patent
Law

(10) Patent No.: US 12,088,657 B2
(45) Date of Patent: *Sep. 10, 2024

(54) SERVER-SIDE PREDICTION OF MEDIA CLIENT STEADY STATE

(71) Applicant: Akamai Technologies, Inc., Cambridge, MA (US)

(72) Inventor: William R. Law, San Francisco, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/959,807

(22) Filed: Oct. 4, 2022

(65) Prior Publication Data

US 2023/0024656 A1 Jan. 26, 2023

Related U.S. Application Data

(63) Continuation of application No. 17/157,511, filed on Jan. 25, 2021, now Pat. No. 11,463,505, which is a continuation of application No. 14/961,950, filed on Dec. 8, 2015, now Pat. No. 10,904,312.

(60) Provisional application No. 62/090,152, filed on Dec. 10, 2014.

(51) Int. Cl.
| | | |
|---|---|---|
| *G06F 15/16* | (2006.01) | |
| *H04L 65/70* | (2022.01) | |
| *H04L 65/75* | (2022.01) | |
| *H04L 65/80* | (2022.01) | |
| *H04L 67/02* | (2022.01) | |
| *H04L 67/1023* | (2022.01) | |

(Continued)

(52) U.S. Cl.
CPC .............. *H04L 67/02* (2013.01); *H04L 65/70* (2022.05); *H04L 65/764* (2022.05); *H04L 65/80* (2013.01); *H04L 67/1023* (2013.01); *H04L 67/1008* (2013.01); *H04L 67/63* (2022.05)

(58) Field of Classification Search
CPC ..... H04L 67/02; H04L 67/63; H04L 67/1008; H04L 67/1023; H04L 65/70; H04L 65/764; H04L 65/80
USPC .................................. 709/217–219, 231–232
See application file for complete search history.

(56) References Cited

U.S. PATENT DOCUMENTS

9,197,677 B2 * 11/2015 Myers ................. H04L 65/1045
10,904,312 B2 * 1/2021 Law ..................... H04L 65/764
(Continued)

*Primary Examiner* — Bharat Barot
(74) *Attorney, Agent, or Firm* — David H. Judson

(57) ABSTRACT

A method of delivering a media stream in a network having first and second media servers each capable of delivering segmented media content to a requesting media client. The network provides for HTTP-based delivery of segmented media, and the media client is supported on a client-side device. The method begins by associating the media client with the first media server. As the first server receives from the media client request for media content segments, request times for a given number of the most-recent segments requested are used to generate a prediction, by the first server, of when the media client has transitioned from a start-up or buffering state, to a steady state. In response to a new segment request being received, and upon the first server predicting that the media client has completed a transition to steady state, the new segment request is redirected to the second media server.

8 Claims, 3 Drawing Sheets

(51) Int. Cl.
*H04L 67/1008* (2022.01)
*H04L 67/63* (2022.01)

(56) References Cited

U.S. PATENT DOCUMENTS

| | | | | |
|---|---|---|---|---|
| 2006/0184688 A1* | 8/2006 | Ganguly | ............... | H04L 67/56 709/231 |
| 2013/0335515 A1* | 12/2013 | Wamorkar | ............ | H04L 65/765 348/E7.083 |
| 2016/0006817 A1* | 1/2016 | Mitic | ................ | H04L 65/80 709/232 |
| 2017/0238027 A1* | 8/2017 | Amidei | ............... | H04L 65/764 709/219 |

* cited by examiner

SERVER-SIDE PREDICTION OF MEDIA CLIENT STEADY STATE

BACKGROUND

Technical Field

This application relates generally to data communication over a network.

Brief Description of the Related Art

Distributed computer systems are well-known in the prior art. One such distributed computer system is a "content delivery network" or "CDN" that typically is operated and managed by a service provider. The service provider typically provides the content delivery service on behalf of third parties (customers) who use the service provider's shared infrastructure. A distributed system of this type is sometimes referred to as an "overlay network" and typically refers to a collection of autonomous computers linked by a network or networks, together with the software, systems, protocols and techniques designed to facilitate various services, such as content delivery, application acceleration, or other support of outsourced origin site infrastructure. A CDN service provider typically provides service delivery through digital properties (such as a website), which are provisioned in a customer portal and then deployed to the network.

Overlay networks of the type described provide HTTP-based streaming from a server in the network, to a client that receives a video stream and plays it back to a screen. Clients may be running on a desktop computer, mobile device (smart phones, tablets), set-top-boxes, smart televisions or appliances, or any other network-connected devices. For a typical HTTP-based streaming use case, the client resolves a name (e.g., a CDN hostname) through DNS to an IP address and makes a TCP connection to the server associated with that address. Once established, the client sends an HTTP GET request for the desired content, e.g., a media fragment. The server responds with the content data in a standard HTTP response body. The connection is kept open for further requests and responses.

While content delivery networks provide significant advantages, typically they include dedicated platforms to support delivery of content for multiple third party runtime environments that are, in turn, based on their own proprietary technologies, media servers, and protocols. These distinct platforms may be costly to implement and to maintain globally and at scale as the number of end users increases. Moreover, at the same time, content providers (such as large-scale broadcasters, film distributors, and the like) desire their content to be delivered online in a manner that complements traditional mediums such as broadcast TV (including high definition or "HD" television) and DVD. This content may also be provided at different bit rates. End users also desire to interact with the content as they can do now with traditional DVR-based content delivered over satellite or cable. A further complication is that Internet-based content delivery is no longer limited to fixed line environments such as the desktop, as more and more end users now use mobile devices such as the Apple® iPhone® to receive and view content over mobile environments.

Today many end users experience problems with HTTP-based streaming, such as slow startup times, re-buffering, and low bitrates. Connectivity of these users often shows large enough bandwidth for high-quality video, but the round-trip times and packet loss characteristics between the server and the client negatively affect streaming performance, primarily because standard TCP-based implementations operate inefficiently on such networks.

By way of additional background, a media client playing back segmented media makes requests for media segments at frequent intervals. During playback, the media client moves through two main playback states—buffering and stable state. During the buffering state, the media player will attempt to build a forward buffer. The purpose of this buffer is to allow the client to avoid playback interruptions caused by fluctuations in throughput. To build such a buffer, the client typically must request the segments faster than it plays them back. Once it has built sufficient buffer, then it must by necessity retreat to a stable state, whereby it requests the segments at the same rate at which it plays them out.

In the prior art, typically the server has insufficient or no knowledge of the client's playback state. This is especially true of stateless servers, which have no knowledge they are participating in a media playback session. It is also true of stateful servers, which may be aware that they are delivering a media stream but still do not know the client's playback state. In such a scenario, typically media must be served from the closest and in some cases most-expensive servers, even if not necessary to preserve a given quality of service (QoS).

BRIEF SUMMARY

This disclosure provides a server-side technique to determine when a media client has stopped buffering and reached a "steady state" playback of the media content it is receiving. Knowledge of when a client is in steady state is very useful to a content delivery network, as that network can then dynamically optimize its delivery to suit that stage of playback. For example, during start-up, the delivery network might want to deliver content as fast as possible to the client. During steady state, when the client is more tolerant of lower throughput, the delivery network might choose to shift delivery to servers with lower cost or those with a higher cache affinity.

In one embodiment, an apparatus that implements the functionality of this disclosure operates server program code that provides for segmented media delivery to media clients. The apparatus may comprise an edge server in an overlay network, such as a content delivery network (CDN), and the media client may be supported on a client-side device, such as a mobile device, set-top box, or the like. The server program code executes on a hardware platform and is operative to receive requests for segments of a media stream from a media client. Each request for a segment is received at a request time. The server program code then computes a function that evaluates to first and second conditions. The function is computed at least in part from the segment request times of a given number of most recent requests. The first condition infers to the server that a transition from a first state to a second state has occurred at the client, and the second condition infers to the server that a transition from the second state to the first state has occurred at the client. The first state is a client buffering or start-up state, and the second state is a client playback steady state. When the client is in the client playback steady state (as determined by the server program code), a new segment request can be redirected to another server if appropriate (e.g., due to a lower cost of delivery). In a variation, the server program code also receives from the media client an affirmative indication that the client has reached the second state, and the receipt of that indication may also be used to trigger redirection of a new segment request to another server.

According to another specific aspect, a method of delivering a media stream in an overlay network having first and second media servers that each are capable of delivering segmented media content to a requesting media client is described. The overlay network may be a content delivery network (CDN) that provides for HTTP-based delivery of segmented media, and the media client may be supported on a client-side device, such as a mobile device, set-top box, or the like. The method begins by associating the media client with the first media server. As the first server receives from the media client request for segments of the media content, request times for a given number of the most-recent segments requested are used to generate a prediction, by the first server, of when the media client has transitioned from a start-up or buffering state, to a steady state. In response to a new segment request being received at the first server, and upon the first server predicting that the media client has completed a transition to steady state, the new segment request is redirected to the second media server.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject disclosure and the advantages thereof, reference is now made to the following descriptions taken in conjunction with the accompanying drawings, in which.

DETAILED DESCRIPTION

Figure 1:
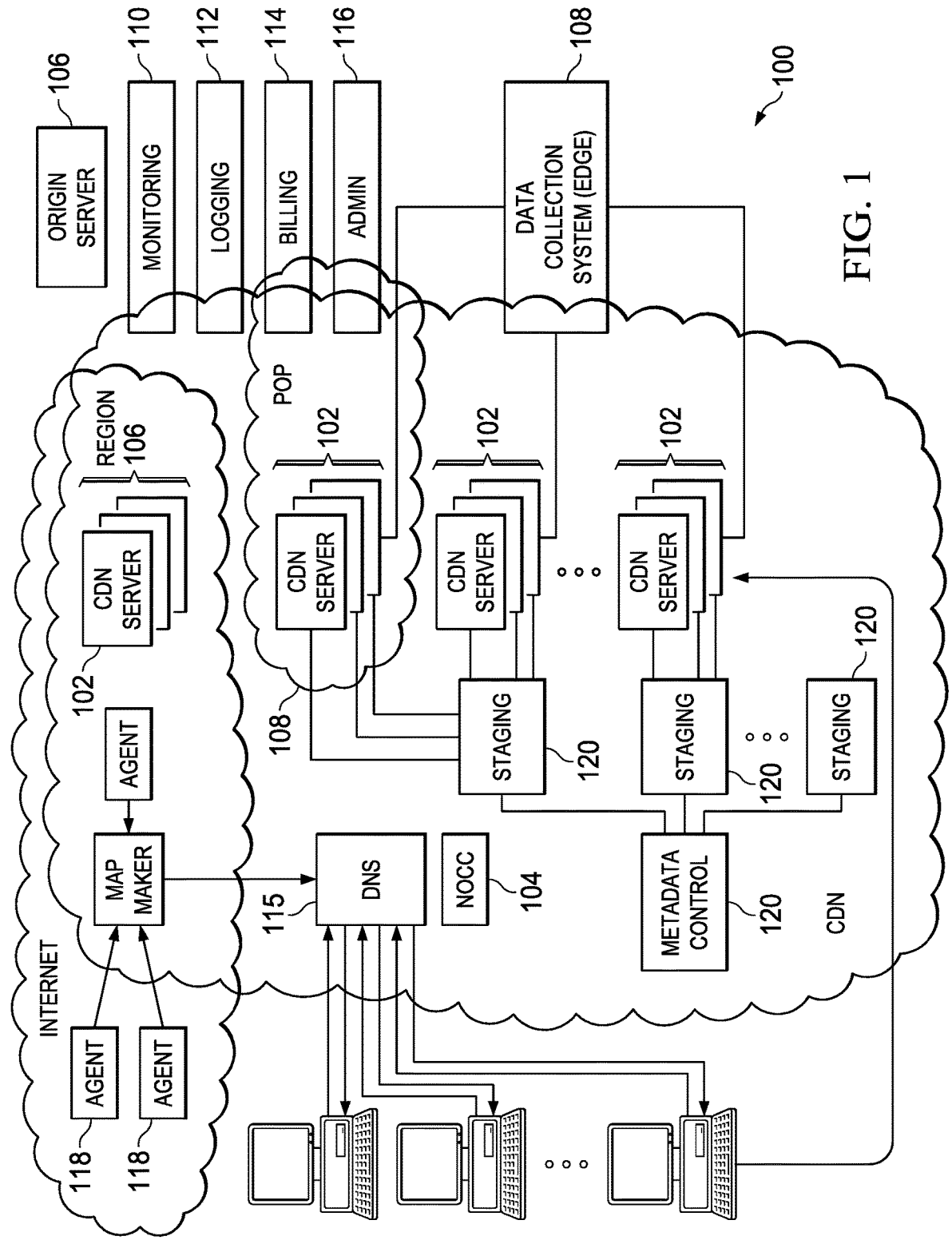
FIG. 1 is a block diagram illustrating a known distributed computer system configured as a content delivery network (CDN)

FIG. 1 illustrates a known distributed computer system.

In a known system, such as shown in FIG. 1, a distributed computer system 100 is configured as an overlay network (e.g. a CDN) and is assumed to have a set of machines 102a-n distributed around the Internet. Typically, most of the machines are servers located near the edge of the Internet, i.e., at or adjacent end user access networks. A network operations command center (NOCC) 104 manages operations of the various machines in the system. Third party sites, such as web site 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or subdomains to domains that are managed by the service provider's authoritative domain name service. End users that desire the content are directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers.

Figure 2:
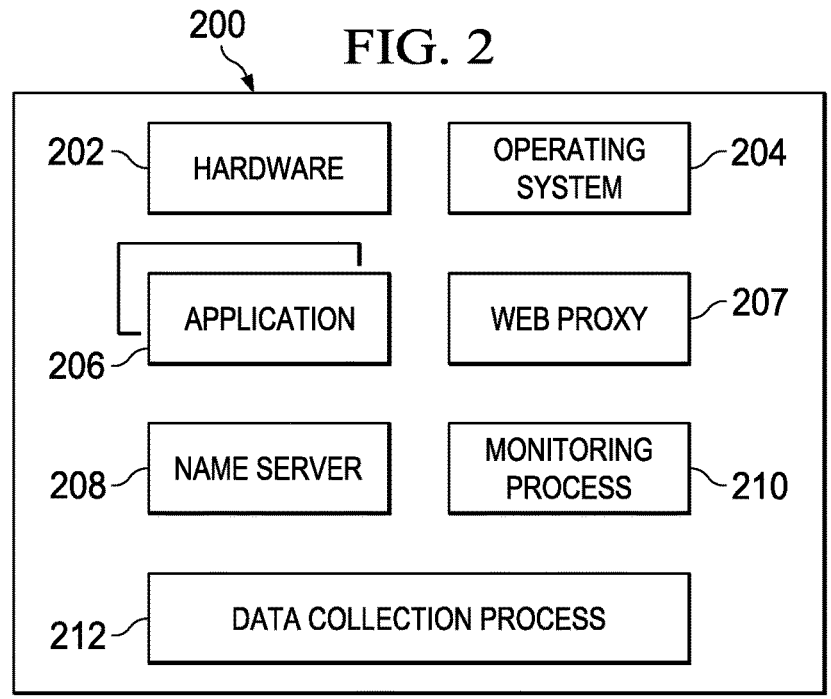
FIG. 2 is a representative CDN edge machine configuration.

As illustrated in FIG. 2, a given machine 200 comprises commodity hardware) 202 running an operating system kernel (such as Linux or variant) 204 that supports one or more applications 206a-n. To facilitate content delivery services, for example, given machines typically run a set of applications, such as an HTTP (web) proxy 207, a name server 208, a local monitoring process 210, and distributed data collection process 212. More generally, the proxy 207 is software, comprising program instructions, which instructions are held in memory and executed by a processor (or multiple processors) as needed.

For streaming media, the CDN machine in an early generation CDN included one or more media servers, such as a Windows Media Server (WMS) or Flash server, as required by the supported media formats. An alternative to using dedicated media servers uses HTTP as the transport protocol. Architectures for HTTP-based live stream and VOD-based delivery are described, for example, in U.S. Publication No. 20110173345, the disclosure of which is incorporated herein by reference. That approach is implemented within a CDN and includes the high level functions of recording the content stream to be delivered using a recording tier, and playing the stream using a player tier. The step of recording the stream includes a set of sub-steps that begins when the stream is received at a CDN entry point in a source format. The stream is then converted into an intermediate format (IF), which is an internal format for delivering the stream within the CDN and comprises a stream manifest, a set of one or more fragment indexes (FI), and a set of IF fragments. The player process begins when a requesting client is associated with a CDN HTTP proxy, such as the proxy. In response to receipt at the HTTP proxy of a request for the stream or a portion thereof, the HTTP proxy retrieves (either from the archive or the data store) the stream manifest and at least one fragment index. Using the fragment index, the IF fragments are retrieved to the HTTP proxy, converted to a target format, and then served in response to the client request. The source format may be the same or different from the target format. Preferably, all fragments are accessed, cached and served by the HTTP proxy via HTTP. In another embodiment, a method of delivering a stream on-demand (VOD) uses a translation tier (in lieu of the recording tier) to manage the creation and/or handling of the IF components.

A CDN edge server of the type described above may be configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server.

Because the CDN infrastructure is shared by multiple third parties, it is sometimes referred to herein as a multi-tenant shared infrastructure. The CDN processes may be located at nodes that are publicly-routable on the Internet, within or adjacent nodes that are located in mobile networks, in or adjacent enterprise-based private networks, or in any combination thereof.

An overlay network web proxy (such as proxy 207 in FIG. 2) that is metadata-configurable is sometimes referred to herein as a global host process.

The CDN may include a storage subsystem, such as described in U.S. Pat. No. 7,472,178, the disclosure of which is incorporated herein by reference.

The CDN may operate a server cache hierarchy to provide intermediate caching of customer content; one such cache hierarchy subsystem is described in U.S. Pat. No. 7,376,716, the disclosure of which is incorporated herein by reference.

The CDN may provide secure content delivery among a client browser, edge server and customer origin server in the manner described in U.S. Publication No. 20040093419. Secure content delivery as described therein enforces SSL-based links between the client and the edge server process, on the one hand, and between the edge server process and an origin server process, on the other hand. This enables an SSL-protected web page and/or components thereof to be delivered via the edge server.

As an overlay, the CDN resources may be used to facilitate wide area network (WAN) acceleration services between enterprise data centers (which may be privately-managed) and third party software-as-a-service (SaaS) providers.

The CDN may also provide client-side software to facilitate various content delivery functions, such as HD streaming. In one approach, the client comprises two components. The first is a non-persistent, in-browser media player that may be based upon third party components to facilitate segmented delivery of media content. The second is an interface in the form of a persistent daemon that can perform "client-side" content delivery. Client-side delivery means downloading content both from CDN edge servers and from other end users who are running the interface and have previously downloaded the same content.

For a typical HTTP-based streaming use case, the client resolves a name (e.g., domain name, hostname, etc.) through DNS to an IP address and makes a TCP connection to the server associated with that address. Once established, the client sends an HTTP GET request for the desired content, e.g., a media fragment. The server responds with the content data in a standard HTTP response body. The connection is kept open for further requests and responses.

With the above as background, the subject matter of this disclosure is now described.

Server-Side Prediction of Media Client Steady State

The approach herein assumes a media client playing segmented media.

A goal of this approach is to provide a server-side technique to determine when such a media client has stopped buffering and reached a "steady state" playback of the media content. In the prior art, and as noted above, the server typically has insufficient or no knowledge of the client's playback state. In such a scenario, media is served from the closest and in some cases most-expensive servers, even if not necessary to preserve a given quality of service (QoS).

This disclosure provides an alternative to such delivery that is based on a server-side prediction of media client steady state.

By way of additional background, and as also described above, a media client playing back segmented media makes requests for media segments at frequent intervals. During playback, the media client moves through two main playback states—buffering and stable state. During the buffering state, the media player will attempt to build a forward buffer. The purpose of this buffer is to allow the client to avoid playback interruptions caused by fluctuations in throughput. To build such a buffer, the client must request the segments faster than it plays them back. Once it has built sufficient buffer, then it must by necessity retreat to a stable state, where it requests the segments at the same rate at which it renders them out.

Knowledge of when a client is in steady state is very useful to a content delivery network, as that network can then dynamically optimize its delivery to suit that stage of playback. For example, during start-up, the delivery network might want to deliver content as fast as possible to the client. During steady state, when the client is more tolerant of lower throughput, the delivery network might choose to shift delivery to servers with lower cost or those with a higher cache affinity.

Figure 3:
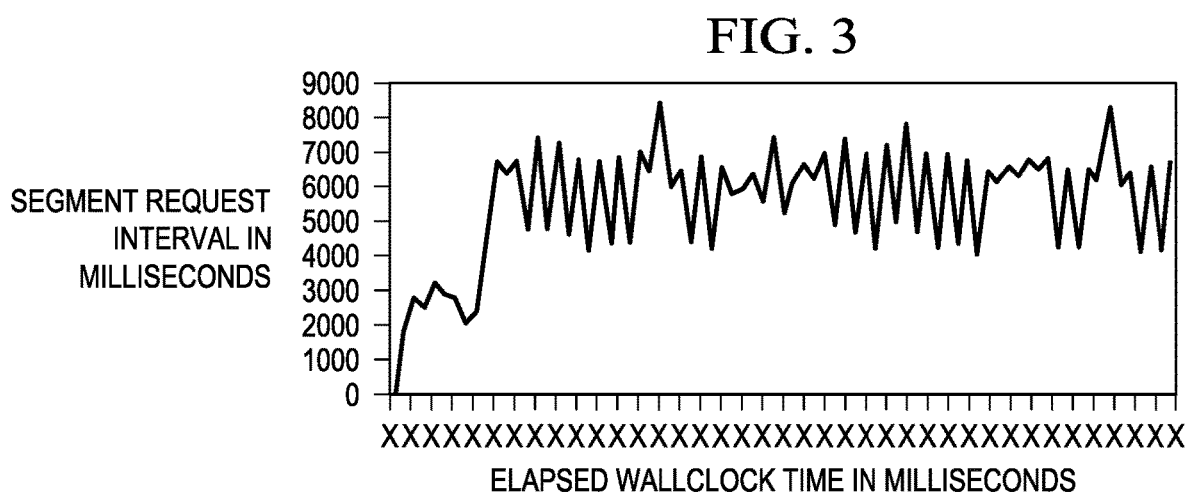
FIG. 3 depicts a graph of a client (a media client or client player that receives and renders segmented content) transitioning from a buffering to a steady state.

FIG. 3 depicts a segmented client (i.e., a media client or client player that receives and renders segmented content) transitioning from a buffering to a steady state. The target buffer in this case is 30 s and the segment duration is constant at 6 seconds. In this case, the transition from the buffering state, where the maximum request interval is ~3000 ms, to the steady state, which is an oscillation around the 6000 ms mark, is clearly seen.

The following describes a more generic playback situation. Suppose there are a series of sequential media segments called $s_1$, $s_2$, $s_3$ etc. that are requested at wall-clock time $t_1$, $t_2$, $t_3$. In the case of adaptive segmented playback, where multiple bitrate versions of the content exist and the client switches between them, we assume that requests $s_1$, $s_2$, $s_3$ . . . $s_n$ are all made against the same bitrate version of the media. Each media segment has a duration d1, d2, d3. The server can infer the client playback state by examining the time difference between requests. Thus, for example, the client is in a start-up state if: $t_2-t_1<d_1$, and it is in a steady state condition if: $t_2-t_1=d_1$. More generically, considering the case for segment n, the server can infer the client is in start-up if: $t_{n+1}-t_n<d_n$, and in steady state if: $t_{n+1}-t_n=d_n$.

In real-world conditions, however, the equivalence is never exact and, therefore, the server might introduce a threshold value h seconds and define that the client is in start-up if: $t_{n+1}-t_n+d_n<h$, and in steady state if: $t_{n+1}-t_n d_n>=h$.

The above algorithm allows for variability in segment duration. For the server to make this inference when serving segment n+1, it must have some knowledge of both the request time and the duration of the prior segment n. This can be achieved either by a stateful server, or by the server setting a cookie on the response to segment n, which defines $t_n$ and $d_n$. This cookie would then be carried forward on the next request for segment n+1, providing the stateless server with the necessary information to infer the client state. There are two issues with this approach, however. The first is that an ambiguous situation can arise when a poorly-connected client is starting playback by downloading segments at close to its available throughput, i.e., such that: $t_2-t_1 \sim = d_1$. In such case the server would falsely interpret this as steady state. The second is that the requirement that the server has knowledge of the duration $d_n$ of segment n is in practice quite difficult to fulfill, as to the server it is just another binary object that it is delivering.

Accordingly, as an alternative, the approach herein preferably looks at the historical values difference in request times. This enables a stateless server to infer when a client has transitioned to steady state.

The details of a preferred method according to this disclosure are now described.

Consider the request for segment n at time $t_n$. Then, define $R_n$ to be the ratio of the interval between this request and some number, say two, requests:

$$R_n = (t_n - t_{n-1})/(t_{n-1} - t_{n-2})$$

Now, define the sum $S_{n,x}$ to be the sum of the X prior values of $R_n$:

$$S_{n,4} = \Sigma(R_{n-1}, \ldots, R_{n-x})$$

Similarly, $S_{n,2}$ is the sum of the 2 prior values of $R_n$:

$$S_{n,2} = \Sigma(R_{n-1}, R_{n-2})$$

It can be shown through empirical analysis that a transition from buffering state to steady state at segment request n then can be inferred if the following Boolean condition (Condition 1) is satisfied:

$$R_n > 3 \text{ AND } S_{n,4} > 3 \text{ AND } S_{n,2} > 2$$

Similarly, a client which is in a steady state has transitioned to a buffering (or startup state) if the following Boolean condition (Condition 2) is satisfied:

$$R_n > 3 \text{ AND } S_{n,4} < R_n \text{ AND } S_{n,2} <= 2$$

As can be seen, the only information required to implement the above-described method on the server-side is the request time $t_n$ of the last r segments. This is information which is known to the server and which can, as long as r is reasonable, be stored in some storage structure associated with the session. Examples would include cookies set on the segment response by the server, as well as an external database which stores a session identifier along with the historical values of r. A value of r=4 is sufficient to predict client state transition with reasonable precision; this is not a limitation of the disclosure, however.

The above method assumes that the client is requesting segments sequentially. Some media clients may choose to request segments in parallel. For example, the server might see requests for n=1, 2, 3 all arriving at time t. Once in steady state, the cadence at which the client requests n segments in parallel cannot exceed the time period over which it would request the same n segments sequentially (otherwise the buffer would either grow or decline). The server should therefore consider the n requests received for segments received within a tight time span $t_s$ where $t_s <<$ segment duration, to be the equivalent of a single request made at time $t_n$. The above method will then hold to determine the client steady state.

Figure 4:
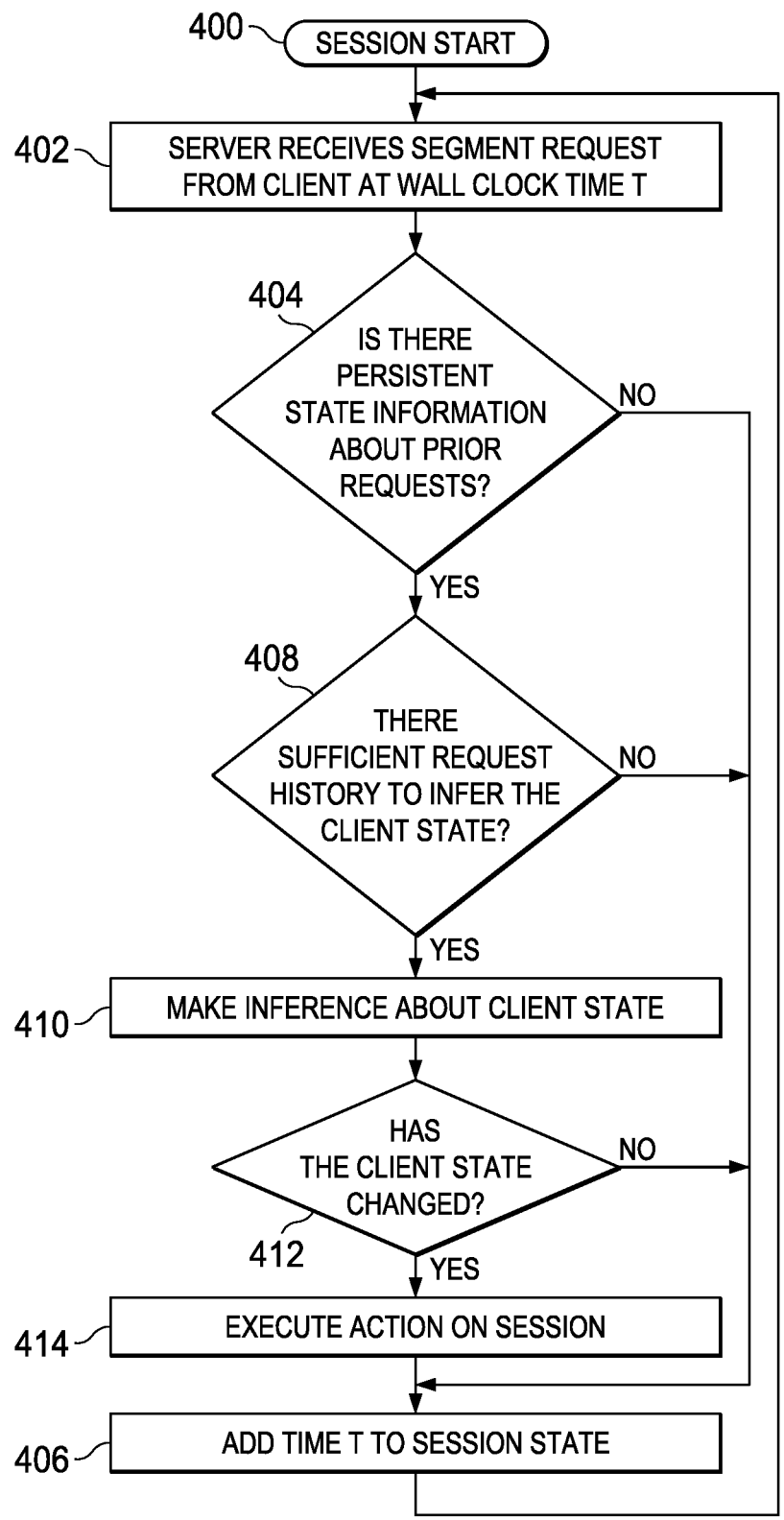
FIG. 4 depicts a process flow of a server-side prediction technique of this disclosure.

FIG. 4 depicts a representative process flow of the server-side function, which may be implemented in software as one or more sets of computer program instructions executed in one or more processing elements. The process begins at step 400 when the session starts. At step 402, the server receives a segment request at wall clock time t. A test is then performed at step 404 to determine whether persistent state information about prior requests exist? If the outcome of the test at step 404 is negative, the routine branches to step 406 to add the time t to the session state. After step 406, control returns to step 402. If, however, the outcome of the test at step 404 is positive, the routine continues at step 408 to test if there is sufficient request history available to infer the client state. When the outcome of the test at step 408 is negative, the routine branches back to step 406. If, however, the outcome of the test at step 408 is positive, the routine continues at step 410 to make an inference about the client state; this operation is described above in a representative example. Thereafter, the routine continues at step 412 to test whether, based on the inference made, the client state has changed? If the outcome of the test at step 412 is negative, the routine returns to step 406 and no action is taken. If, however, the outcome of the test at step 412 is positive, the routine continues at step 414 to execute a given action on the session. Thereafter, control returns to step 406, and the process completes.

Once in possession of the client playback state, the server can then apply a number of possible optimizations, several of which are now described.

For example, a segment request can be redirected to a server that has a higher roundtrip time (RTT) but lower cost of delivery. A practical example of this would be a cheap data center in Denver. Clients in Los Angeles could be served from a local Los Angeles server during their buffering phase and then from Denver once they had reached steady state.

As another example, a segment request can be redirected to server that has a higher likelihood of having that segment in cache. Traditionally, content for Customers A and B must contend for cache space on each and every edge server. Imagine a scenario however in which Customer A's content is preferentially cached on centralized server 1 and Customer B's on centralized server 2. An edge server would only need to cache the segments most often associated with the buffering state (this would in practice be the starting segments of every stream) and then could redirect clients for Customer A in steady-state to server 1 and clients for Customer B in steady state to server 2. Because server 1 does not have to cache any content from Customer B, it can hold much more of Customer A's content.

Further optimizations to this generalized approach are possible.

For example, if the server stored the total bytes transferred as well as the time of the request, then at steady state it would have an estimate of the playback rate of the content it is delivering. By combining this with the estimate of throughput it is seeing between client and server, the server can make a more intelligent decision about where to redirect the traffic. In particular, imagine a scenario in which an edge server in Los Angeles has a choice in redirecting a segment request after determining that the client has reached steady state. It has two possible redirect targets—a data center in Denver at cost basis of 0.8 (compared to 1.0 for Los Angeles) at an RTT of 50 ms and a data center in Virginia with a RTT of 100 ms but a cost basis of 0.5. The server determines that the throughput between itself and this client is 4 Mbps. If it estimates that the segment bandwidth is 1 Mbps, then it will redirect to the Virginia data center, because there is good overhead between the throughput and media bandwidth and the client can likely sustain the necessary QoS over the longer RTT. If it estimates that the segment bandwidth is 2 Mbps, then it would opt for the Denver server at the slightly closer RTT. If it estimates that segment bandwidth is 3 Mbps, then it could choose not to redirect at all, as the increased RTT might impact the client's quality of service and cause it to switch down.

As another variant, a client player can optionally signal to the server when it has reached steady state. This could be done via simple standardized request headers and/or query arguments. This approach is unambiguous and robust and removes the chance of false positive predictions. It would be possible to operate this explicit scheme on top of a default implicit predictive scheme described.

The described mechanism enables the overlay network (e.g., CDN) server to infer when the client is in a steady state so that the network can then dynamically optimize its delivery to suit that stage of playback. In one embodiment, during start-up, the delivery network delivers content to the media client as fast as possible. During steady state, when the client is more tolerant of lower throughput, the delivery network shifts delivery to servers with lower cost or those with a higher cache affinity.

More generally, the approach described herein may be implemented whenever HTTP streaming from server to client is required. A client refers to the side receiving the video stream and playing it back to a screen. Clients may be running on a desktop computer, mobile device (smart phones, tablets, etc.), set-top boxes, smart televisions, or any other connected devices. The server is the side sending out the stream data to the client. A request from a media client may traverse an intermediary, such as a gateway or other device. As referenced herein, HTTP-based streaming refers to any video streaming which uses only HTTP protocol to request and download objects to construct the stream for playback. Non-limiting examples include Apple HLS, Adobe HDS, Microsoft Smooth Streaming, and MPEG-DASH. The approach herein may be used to support live and on-demand streaming.

The delivery approach described herein improves video streaming quality. The approach can fit transparently into existing HTTP-based or other non-HTTP-based streaming solutions, as the actual protocol used to deliver the segment to the client is of no importance to the solution, which relies solely upon the time of request.

In a representative implementation, the subject functionality is implemented in software, as computer program instructions executed by a processor.

More generally, the techniques described herein are provided using a set of one or more computing-related entities (systems, machines, processes, programs, libraries, functions, or the like) that together facilitate or provide the functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a standalone machine, or across a distributed set of machines. The functionality may be provided as a service, e.g., as a SaaS solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

While given components of the system have been described separately, one of ordinary skill will appreciate that some of the functions may be combined or shared in given instructions, program sequences, code portions, and the like.

Preferably, the functionality is implemented in an application layer solution, although this is not a limitation, as portions of the identified functions may be built into an operating system or the like.

Generalizing, there is no limitation on the type of computing entity that may implement the client-side or server-side of the connection. Any computing entity (system, machine, device, program, process, utility, or the like) may act as the client or the server.

The particular manner by which a media server determines that it should redirect a new media segment request to another source may vary, and it may depend on various factors such as cost, performance, load, latency, and combinations thereof. The determination of whether to make such a switch may be carried out by the media server itself, or using other computing entities within or in association with the overlay network. The particular switching functionality itself is not an aspect of this disclosure.

A new media segment request may be re-directed in any convenient manner, such as an HTTP 302 redirect command.

The techniques herein provide for improvements to another technology or technical field, namely, media delivery systems, as well as improvements to the functioning of media servers within such systems.

What is claimed is as follows:

1. A computer program product in a non-transitory computer readable medium comprising computer program code executed in a hardware processor of a media delivery server during a session to perform operations that include:
   connecting to a media client issuing client media segment requests;
   generating a prediction when the media client issuing the client media segment requests has transitioned to a client playback steady state; and
   taking an action when the media client is predicted to have transitioned to the client playback steady state, the action redirecting a client media segment request to another media delivery server associated with the media delivery server and that has one of: a lower cost of delivery, and a higher cache affinity, as compared to the media delivery server;
   wherein the prediction is generated by:
   computing, from a given number of most recent client media segment requests, a function that evaluates to first and second conditions, the first condition inferring to the media delivery server that a transition from a first state to a second state has occurred at the client, and the second condition inferring to the media delivery server that a transition from the second state to the first state has occurred at the client, the second state being the client playback steady state.

2. The computer program product as described in claim 1, wherein the first state is a client buffering or start-up state.

3. The computer program product as described in claim 1 wherein the computer program code is further operative to receive from the media client an affirmative indication that the media client has reached the second state, and to use receipt of that indication to take the action.

4. The computer program product as described in claim 1, wherein for a client media segment request for segment n at time $t_n$, the prediction is generated based in part on a ratio $R_n=(t_n-t_{n-1})/(t_{n-1}-t_{n-2})$ computed from difference values for two or more recent client media segment requests.

5. A computer program product in a non-transitory computer readable medium comprising computer program code executed in a hardware processor of a media delivery server during a session to perform operations that include:
  connecting to a media client issuing client media segment requests;
  computing an estimated playback rate of a media stream at the media client based on a request time and a number of bytes transferred to the media client;
  generating a prediction when the media client issuing the client media segment requests has transitioned to a client playback steady state; and
  taking an action when the media client is predicted to have transitioned to the client playback steady state, the action redirecting a client media segment request to another media delivery server associated with the media delivery server and that has one of: a lower cost of delivery, and a higher cache affinity, as compared to the media delivery server.

6. The computer program product as described in claim 5, wherein the media delivery server and said another media delivery server are associated with an overlay network.

7. The computer program product as described in claim 6, wherein the overlay network is a content delivery network (CDN).

8. The computer program product as described in claim 5, wherein the computer program code is further configured to output a media stream to the media client.

* * * * *